United States Patent Office 3,438,261
Patented Apr. 15, 1969

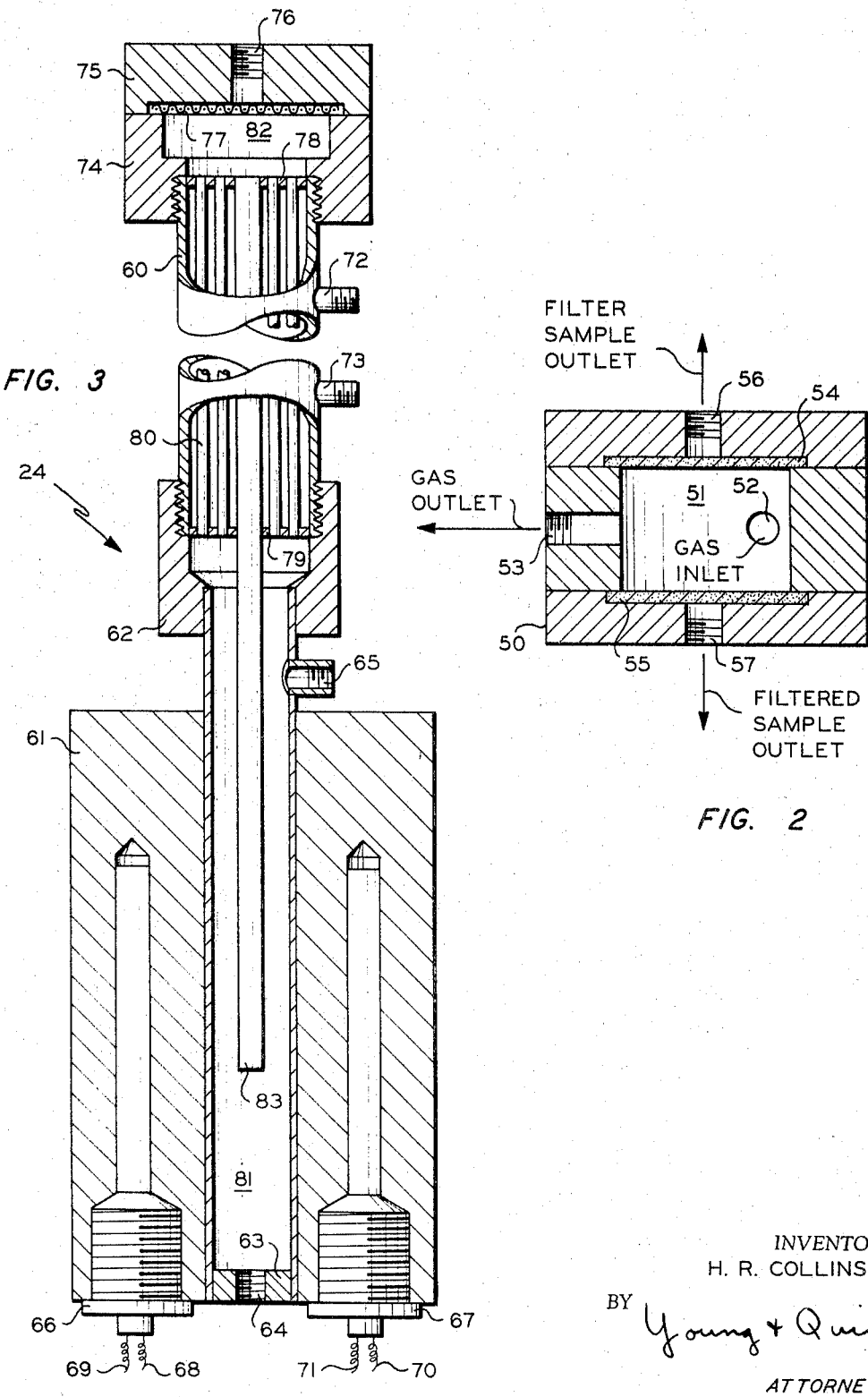

3,438,261
SAMPLING SYSTEM
Henry R. Collins, Jr., Channelview, Tex., assignor to Phillips Petroleum Company, a corporation of Delaware
Filed Jan. 20, 1967, Ser. No. 610,630
Int. Cl. G01n 1/22
U.S. Cl. 73—421.5                                     9 Claims

ABSTRACT OF THE DISCLOSURE

An apparatus for preparing a gas sample from a high-temperature process stream for analysis having a particulate filtering means, a cooler, and an equilibrium column wherein steam is separated from the sample by condensation. The column is provided with heaters to maintain collected condensate at its boiling point, thereby minimizing the condensation of water-soluble constituents in the sample.

---

This invention relates to a system for providing a sample from a process stream for an automatic analyzer. In one aspect this invention pertains to an improved system for preparing a sample from a high temperature, low pressure process stream for an automatic analyzer.

In order to maximize the efficiency and the quality of products from some chemical processes, it is often desirable to control process variables by analysis of a process stream which is affected by the process variable. This type of analysis and process control is especially effective when there is a correlation between the concentration of certain components within the process stream and process variables. Various types of instruments have been developed for the analysis of fluid streams. These instruments include infrared analyzers, differential refractometers, ultraviolet spectrophotometers, mass spectrometers, and chromatographic analyzers, for example. In many of these instruments the sample stream to be tested must be supplied as a gas at substantially a constant pressure. The particular process stream desired to be sampled may be at a high temperature and a low pressure. Also the sample from the process stream may be contaminated by particulate matter which must be removed before the stream can be analyzed for a selected component. The major problem associated with a sample from this type of process stream is not one of the analysis technique but one of proper sampling. Once the sampling problem is solved, the analysis is straight forward using various instrumentation like that mentioned above.

To eliminate clogging problems associated with mass filtering of entrained particulate matter, to reduce the sample temperature for easier handling, and to provide a means for transporting a low pressure gas, one procedure used heretofore for preparing a sample of this nature was to use a steam ejector for transporting the low pressure sample and water-spray chambers for removal of particulate matter and for sample cooling. A sample prepared by this procedure is not accurately representative of the process stream if the stream contains water-soluble constituents, the concentration of which is to be determined by the analysis. Unknown amounts of these water-soluble constituents will be scrubbed from the sample in the spray chambers thereby making the analytical results inaccurate. This problem is compounded if the water-soluble constituents comprise a small percentage of the stream, i.e., removal of any appreciable amount of the constituent has a significant effect on its weight percent in the total sample.

An example of a specific chemical process where it is desirable to sample and analyze a high-temperature, low-pressure, process stream, containing particulate materials which must be removed before analysis, is the effluent gas from a carbon black reactor. The analysis desirable for the optimum control of the carbon black reactor is the acetylene and carbon dioxide concentration in the effluent gas. These data give an indication of the reactor operation and can be used to make the necessary adjustments to process variables. Some of the typical process variables are: reactor temperature, conversion oil preheat temperature, reactor air preheat temperature, quench water temperature, and air, tangential oil and conversion oil flow rates. The concentration of acetylene and carbon dioxide, water-soluble constituents in the effluent gas, is extremely low so the analysis of a sample to determine the acetylene and carbon dioxide contained therein which has been prepared by the water-spray chamber method is at best questionable. An unknown quantity of acetylene or carbon dioxide may be scrubbed in the water-spray chambers.

Accordingly, it is an object of this invention to provide an improved system for preparing a continuous, representative sample from a high-temperature chemical process stream for an automatic analyzer.

Another object of this invention is to provide a system for preparing a sample from a low-pressure, high-temperature, chemical process stream containing entrained particulate matter and water-soluble constituents for an analysis so that a minimum of the water-soluble constituents are removed during cooling and particulate removal.

A further object of this invention is to provide a sampling system capable of preparing a sample from a carbon black reactor effluent gas for analysis.

Other aspects, objects and several advantages of this invention will be apparent to those skilled in the art from the following description, drawings, and appended claims.

FIGURE 2 is a sectioned, elevation view illustrating an exemplary design of the filter of FIGURE 1.

FIGURE 3 is a more detailed sectioned, elevation view of an equilibrium chamber for use in the sampling system shown in FIGURE 1.

Figure 1:
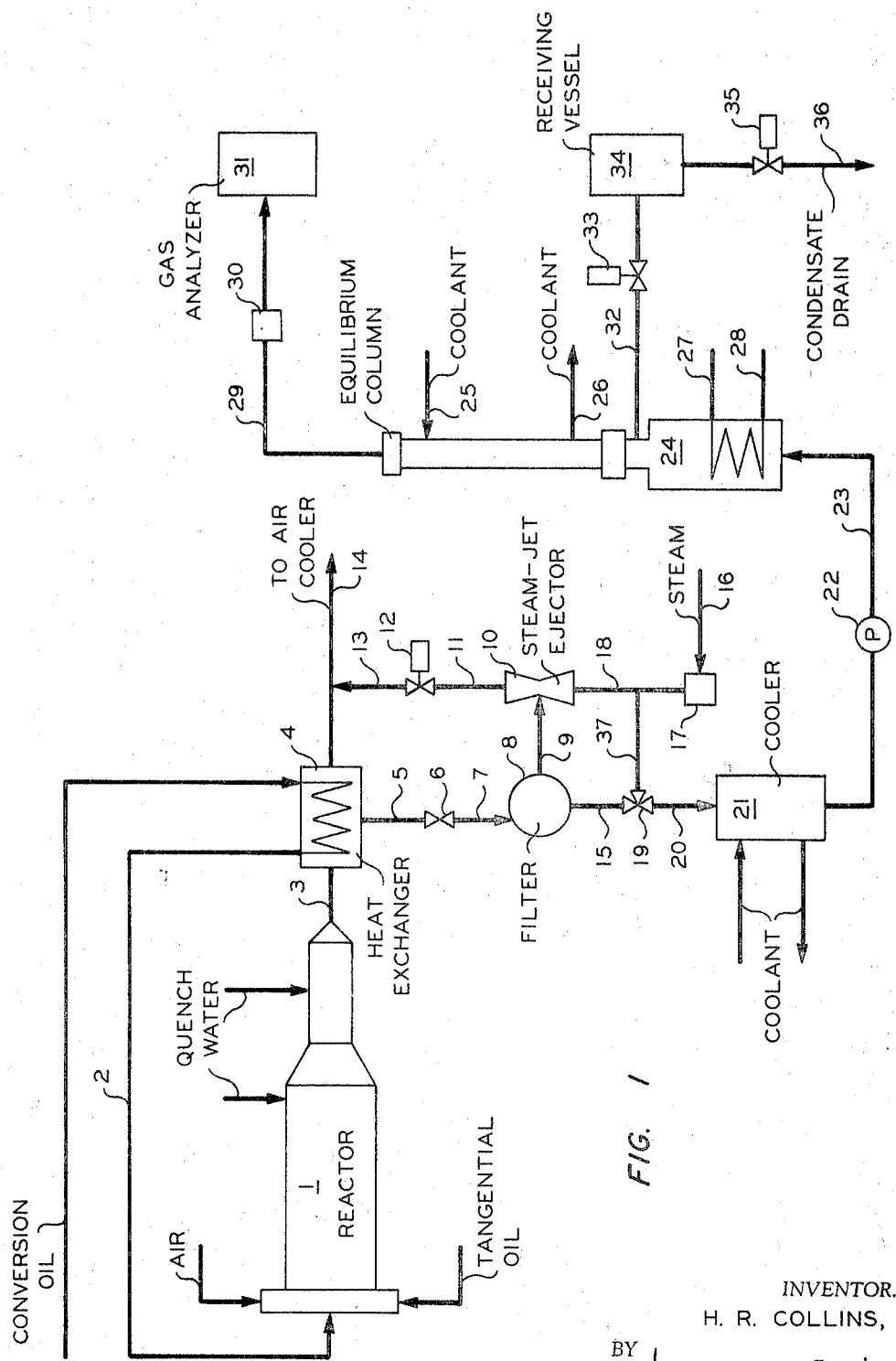
FIGURE 1 is a schematic diagram of the sampling system of this invention used in conjunction with a carbon black reactor.

According to this invention, a system is provided for passing a high-temperature gas sample through a filtering means for removal of particulate matter contained therein, cooling the sample to a temperature level for easier handling and separating the steam from the sample by condensation in an equilibrium column. In this column the steam condensate is collected and heated to a temperature corresponding to the boiling point of water at the internal pressure of the column. After an equilibrium is established between the water-soluble constituents in the sample and the condensate, i.e., the condensate becomes saturated with the water-soluble constituents, the vapor sample passing overhead from the equilibrium column to an analyzer will contain concentrations of water-soluble constituents accurately representative of the process stream being analyzed. If the sample is at low pressure, means are provided for transferring the sample through the system. Means are also provided to prevent plugging of the sampling line and to handle overflowing condensate from the equilibrium column.

Referring to FIGURE 1, a reactor 1 is utilized in the pyrolyzation of a conversion oil to carbon black in which process the oil is first passed through heat exchanger 4 where it is preheated and then fed via line 2 into the reactor. In the reactor the oil is heated to high temperature in the presence of air thereby forming carbon black. Quench water is added to the reactor to control the reaction. Carbon black formed in reactor 1 passes there-from as small particles suspended in gas via line 3. The effluent gas from reactor 1, commonly referred to as "smoke," typically is comprised of about 60 weight percent steam, 28 weight percent nitrogen, 5 weight percent carbon monoxide, 4 weight percent hydrogen, 2 weight percent carbon dioxide, 0.3 weight percent acetylene, traces of argon and methane, and carbon black in the range of 10–35 grams per cubic foot.

A portion of the effluent gas is passed from heat exchanger 4 via line 5, valve 6, and line 7 to filter 8. The gas stream at the point where line 5 connects to heat exchanger 4 is at about 1100° F. and 16 p.s.i.a. The low pressure sample is pulled through filter 8 by steam-jet ejector 10 via line 9, as described hereinafter, and is returned to the process stream conduit 14 via line 11, normally-open, solenoid-operated valve 12 and line 13. A filtered sample passes from filter 8 through line 15.

Filter 8 is an in-line filter of any suitable type which allows self-cleaning by the gas stream passing therethrough. FIGURE 2 illustrates a filter exemplary of this type design. The filter is comprised of a body 50 having an internal cylindrical chamber 51, a gas stream inlet port 52 located so that the direction of the flow of entering gas stream is tangential to the cylindrical chamber, a gas stream outlet 53, filter elements 54, 55, and filtered-sample outlets 56 and 57. Gas inlet 52 is connected to line 7 of FIGURE 1, gas outlet 53 is connected to line 9 of FIGURE 1, and filtered-sample outlets 56 and 57 are connected to line 15 of FIGURE 1. The filter elements may be of any conventional material compatible with the elevated gas temperatures of the sample and have a pore size depending upon the size of the particulate matter in the gas stream being analyzed. Filter body 50 is provided with small lines (not shown) for steam tracing with high pressure steam to prevent any condensation of the steam contained in the gas stream flowing through the filter. Condensation in the filter is undesirable because of the formation of a slurry with the filtered particles thereby causing filter clogging. Also, condensation would affect the accuracy of the sample prepared for analysis because a finite amount of the water-soluble constituents could be condensed with the steam.

The gas stream enters filter 8 through inlet 52, circulates around cylindrical chamber 51, and passes out through outlet 53. The actual sample used for analysis passes through the walls of the filter elements 54 and 55, upon which particulate matter is deposited, and is withdrawn at outlets 56 and 57. The particles deposited on the inner wall of the filter elements 54 and 55 are swept away by the high velocity stream circulating within cylindrical chamber 51 thereby creating a cyclone effect and are passed out through outlet 53. Referring again to FIGURE 1, a conventional steam-jet ejector 10 provides the velocity to the gas stream through filter 8. Steam is introduced to steam-jet ejector 10 through line 16, regulator 17 and line 18. High velocity steam passing through a nozzle within ejector 10 pulls the gas stream through filter 8 and line 9. Since steam-jet ejectors are well known in the art a detailed description of its operation is omitted for purposes of brevity. Regulator 17 is adjusted to regulate the pressure level of steam to ejector 10 thereby governing the velocity of the gas stream through filter 8. The level of the steam pressure, and therefore the velocity of the gas stream, depends upon the concentration of the particulate matter in the stream, the particulate size, the filtering means used, and the like.

For process streams with high pressures, a conventional self-cleaning filter, such as Hallikainen Instruments Self-Cleaning In-Line Filter, Model 1090, can be used without a steam-jet ejector 10. The high pressure will provide the necessary velocity to obtain the desired sweeping away of particles deposited on the inner walls of the filter elements.

From filter 8, the filtered sample is transferred by diaphragm pump 22 through line 15, 3-way solenoid-operated valve 19, line 20, cooler 21, line 23 to equilibrium column 24 where the steam is separated from the sample. Cooler 21 can be of any conventional design, such as a shell-and-tube heat exchanger with water as the coolant. The cooling is performed to reduce the temperature of the gas sample to a level at which it can be transferred with conventional equipment. Pump 22 is a large internal volume diaphragm pump of any design capable of transferring mixed vapor and liquid phase flow; the mixed phase resulting from the cooling of the sample. Pump 22 is used to raise the pressure of the sample to the level maintained in the equilibrium column 24. If the process stream being sampled is at a pressure higher than the level maintained in the equilibrium column 24, then pump 22 is not required.

Equilibrium column 24 contains a cooling means (shown in FIGURE 3) which is connected to an inlet line 25 and an outlet line 26 for circulating a coolant therethrough. Equilibrium column 24 also contains electrical heating means which are connected to electrical leads 27 and 28 for heating the steam condensate as described hereinafter. A conduit 29 leads from the upper end of equilibrium column 24 to analyzer instrument 31 which may be any type of instrument adapted to measure the concentration of a component in the gas stream or any characteristic of the gas stream which is useful in controlling a process variable, preferably a gas chromatographic analyzer. Back pressure regulator 30 disposed in conduit 29 is provided to maintain a predetermined pressure in the equilibrium column.

Steam condensate separated from the sample in equilibrium column 24, as shown in FIGURE 3, overflows through conduit 32, through normally-open solenoid-operated valve 33 into receiving vessel 34. Condensate in receiving vessel 34 is drained to any suitable disposal connected thereto through conduit 36 by opening normally-closed, solenoid-operated valve 35.

Three-way valve 19 and normally-open, solenoid-operated valve 12 are provided in lines 15 and 13 so that filter 8 may be back-flushed to remove any particles lodged on the filter elements. Valves 19 and 12 are operatively connected with a source of electrical power (not shown). When valve 12 is energized closed and valve 19 is energized so that the normally-closed port is open, steam will pass through regulator 17, line 18, line 9 into the cylindrical chamber in filter 8. The steam will also pass through line 37, line 15 and back through the filter elements. Since the pressure in the filter will be higher than the process stream any particles on the filter are swept away through line 7, valve 6 and line 5 back into the system. This operation can be performed at regular intervals to insure no clogging of the filter and sample lines. If desired, a timer may be connected in conjunction with the source of electric power to provide this automatic control of the back-flushing at regular intervals. Of course this back-flushing feature may be omitted if downtime to clean the filter is not disadvantageous to the operation or if the particulate matter is adequately swept away by the self-cleaning action of the filter.

Lines 5, 7, and 15 are provided with small steam lines to maintain the gas passing therethrough at an elevated level to prevent undesirable condensation, as discussed previously, during sampling and back-flushing operations.

Solenoid-operated valves 33 and 35 provide the capability of dumping the condensate flow overboard from equilibrium column 24 without causing a significant change of pressure in the equilibrium column. When normally-closed valve 35 is energized open to drain the condensate from receiving vessel 34, simultaneously, normally-open valve 33 is energized closed. By locating the back pressure regulator 30 in close proximity to analyzer instrument 31 pressure changes in equilibrium column 24 are minimized. Valves 33 and 35 are connected in the same electrical circuitry as the source of electrical power to valves 19 and 12 (not shown) so that the filter back-flushing and the condensate draining occur at the same time.

Valves 6 and 12 can be closed to isolate the sampling system from the process stream for repairs, cleaning, and the like. The lines or conduits connecting the sampling system with the analyzer should be as short as possible in order to reduce the time of travel of the system. This reduces the lag time between the time the process stream has a detectable condition requiring a control change and the time the change is made.

Referring to FIGURE 3, an exemplary construction of an equilibrium column 24 of FIGURE 1 is illustrated. Equilibrium column 24 comprises a metal shell 60 and a metal housing 61. The top of housing 61 is provided with a flange 62 which is threaded into the bottom of shell 60. Bottom closure member 63 of housing 61 has a sample inlet 64. Line 23 of FIGURE 1 connects with inlet 64. Condensate outlet 65 is provided in the upper portion of housing 61. Line 32 of FIGURE 1 connects with outlet 65.

Conventional electrical resistance heaters 66 and 67, threaded into recesses provided in the lower portion of housing 61, have electrical leads 68, 69, 70, and 71, which are connected to a suitable source of electrical source of energy (not shown) by leads 27 and 28 of FIGURE 1.

Coolant inlet 72 and coolant outlet 73 are provided in the upper and lower portions of shell 60, respectively. Line 25 of FIGURE 1 connects with coolant inlet 72 and line 26 of FIGURE 1 connects with coolant outlet 73. Flange 74 is threaded onto the top of shell 60. Shell 60 is closed at the upper end by closure member 75 which is bolted to flange 74. Closure member 75 is provided with a sample outlet 76. Line 29 of FIGURE 1 connects to sample outlet 76. A hydrophobic filter 77, positioned between closure member 75 and flange 74, is used as a demister, i.e., removes water droplets from the vapor sample. Any conventional type of hydrophobic filter is acceptable. A sub-micron fluorinated vinyl filter has been utilized with good results in a system substantially as shown in FIGURE 1.

Disposed within and attached to the inside walls of shell 60 are upper and lower baffle plates 78 and 79. A plurality of small tubes 80, attached inside apertures provided in baffle plates 78 and 79, communicate between chamber 81 within housing 61 and chamber 82 defined by filter 77 and baffle plate 78 in shell 60. A larger tube 83, centrally disposed within shell 60, attached to center of upper baffle plate 78, and extending through the center of lower baffle plate 79, communicates between chamber 82 and lower portion of chamber 81. Tube 83 provides a conduit for the water droplets removed from the vapor sample passing overhead by filter 77 to pass to the lower portion of chamber 81.

A vapor sample entering inlet 64 passes upward through the inside of tubes 80. Coolant, introduced through inlet 72, circulating around the outside of tubes between baffle plates 78 and 79 causes condensation of the steam contained in the sample. The condensate collects in chamber 81 where it is heated to the boiling point of water at the pressure maintained in the equilibrium column by heaters 66 and 67. As the condensate builds up it overflows through outlet 65 and is disposed as described previously. By maintaining the steam condensate at the boiling point of water and passing the sample up through the condensate, the steam condensate becomes saturated with the water-soluble constituents. After this equilibrium has once been established, the vapor passing overhead from the equilibrium column 24 through outlet 76 to the analyzer instrument 30 will contain concentrations of water-soluble constituents accurately representative of the process stream being analyzed.

A system substantially as shown in FIGURE 1 has been utilized for preparing a carbon black reactor effluent gas for analysis. Gas sample was passed through filter 8 where the carbon black and other particulate matter was removed. Filter 8 contained silver filter elements with 0.2 micron size pores. Steam-jet ejector 10 was operated at a pressure in the range of 50 to 55 p.s.i.a. Pump 22 was set so that the flow of the filtered sample through line 15, valve 19, line 20, cooler 21, and line 22 was at a substantially constant rate of approximately 2000 cubic centimeters per minute. All of the filtered sample taken was passed through line 23 into equilibrium chamber 24. Back pressure regulator 30 was set to maintain a pressure of approximately 30 p.s.i.a. in equilibrium column 24. Water was introduced into coolant inlet 72 of equilibrium column 24 and the flow rate adjusted so that the vapors rising through tubes 80 were cooled from about 250° F. to about 85° F. thereby condensing steam in the sample. The condensate in chamber 81 was heated to approximately 250° F. The vapor effluent from equilibrium column 24 was passed to a conventional gas chromatographic analyzer which determined the acetylene, carbon dioxide, carbon monoxide, and hydrogen concentrations in the sample.

These data were compared to data obtained from a sample taken from the same process stream and prepared by the conventional water-spray chamber method for separating particulate matter and cooling the sample. It was found that the concentration of the water-soluble constituents, acetylene and carbon dioxide, was significantly higher in the sample prepared by a system of this invention as described above; the acetylene concentration being approximately 25 weight percent higher and the carbon dioxide approximately 8 weight percent higher. These higher concentrations more accurately represent the actual reactor effluent gas composition thereby permitting closer control of the carbon black reactor by proper adjustments of the control variables.

The sampling system substantially as shown, described, and operated in accordance with this invention can be utilized with similar improved results in controlling the operation of a thermal-cracking furnace producing ethylene. The resulting products from the thermal cracking contain water, hydrogen, a complex mixture of hydrocarbons, tar and coke in addition to the ethylene. An analysis of the furnace effluent gas is desirable to determine the concentration of the hydrocarbons containing 5 carbon atoms or less therein to provide data which indicates the thermal cracking efficiency of the furnace, thereby affording the capability of optimum control of the thermal cracking operation. The entrained coke and particulate matter are filtered and water and heavier hydrocarbons are separated from the vapor sample in the equilibrium column by proper adjustment of the cooling, heating and back pressure. The sample can then be analyzed by any conventional analyzer, such as a chromatographic analyzer.

It should be understood that the sampling system and method of operating same as disclosed herein are applicable to any chemical process in which it is desirable to control a process variable by analysis of a process stream which must be removed prior to analysis.

Certain modifications of the invention will become apparent to those skilled in the art and the illustrative details disclosed are not to be construed as imposing unnecessary limitations thereto.

I claim:
1. A sampling system for preparing a high-temperature gas, sample entrained with particulate matter comprising, in combination:
   (a) a filtering means having a gas stream inlet, a gas stream outlet and a filtered-sample outlet;
   (b) a cooling means having an inlet and an outlet, said inlet being connected to said filtered sample outlet of said filter means;
   (c) an equilibrium column connected to the sample outlet of said cooling means having a vapor outlet at the upper level, a liquid outlet at an intermediate level, a cooling means in the upper section thereof, and a heating means in the lower section thereof; and (d) a liquid disposal means connected to the liquid outlet of said equilibrium column.

2. The sampling system according to claim 1 further comprising a gas analyzer connected by a first conduit means with the vapor outlet of said equilibrium column and a back pressure regulator in said first conduit means.

3. The sampling system according to claim 2 wherein said gas analyzer is a chromatographic analyzer.

4. The sampling system of claim 2 wherein said equilibrium column includes a demister disposed within said column between said cooling means and said vapor outlet.

5. The sampling system according to claim 4 wherein said liquid disposal means comprises a shutoff valve connected to the liquid outlet of said equilibrium column, a receiving vessel connected to said first shutoff valve and a second shutoff valve connected to said receiving vessel in that order.

6. The sampling system according to claim 5 further comprising:

(a) a diaphragm pump having an inlet and an outlet;
(b) a second conduit means connecting the inlet of said pump to the outlet of the first mentioned said cooling means; and
(c) a third conduit means connecting the outlet of said pump to the inlet of said equilibrium column.

7. The sampling system according to claim 6 further comprising:

(a) a steam-jet ejector having a gas inlet, a steam inlet and a discharge;
(b) a fourth conduit means connecting the gas inlet of said ejector to the gas stream outlet of said filtering means; and
(c) a fifth conduit means connecting the steam inlet of said ejector to a source of steam.

8. The sampling system according to claim 7 further comprising a sixth conduit means connecting the sample outlet of said filtering means to the inlet of said cooling means and a three-way valve disposed in said sixth conduit means which in one position connects the sample outlet of said filter means with a source of steam while shunting off flow to said cooling means.

9. The sampling system according to claim 8 wherein said filtering means comprises:

(a) a body having an internal, cylindrical chamber;
(b) said body having two sample outlet passages, one at the top and one at the bottom, in communication with said chamber;
(c) filtering elements disposed within said body so as to cover the openings of said sample outlet passages into said chamber;
(d) said body having a gas stream inlet passage communicating with said chamber and arranged so that the direction of flow of gases passing therethrough is initially tangential to said chamber; and
(e) a gas stream outlet passage on the side of said body in communication with said chamber.

References Cited

UNITED STATES PATENTS

| | | | |
|---|---|---|---|
| 2,306,606 | 12/1942 | Hirsch | 73—422 |
| 2,489,893 | 11/1949 | Johnson | 73—421.5 XR |
| 2,550,933 | 5/1951 | McEvoy | 73—421.5 |
| 2,814,952 | 12/1957 | Ryant et al. | 73—421.5 XR |

LOUIS R. PRINCE, *Primary Examiner.*

HARRY C. POST III, *Assistant Examiner.*

U.S. Cl. X.R.

73—422